United States Patent [19]

Samokovliski et al.

[11] 4,261,499
[45] Apr. 14, 1981

[54] PLANETARY WIRE-FEEDING DEVICE

[75] Inventors: David A. Samokovliski; Alfred E. Nemecheck, both of Sofia; Emil A. Maximov, Panagyurishte; Peter D. Petrov, Sofia; Ivan I. Ivanov, Sofia, all of Bulgaria

[73] Assignee: CUV "Progress", Sofia, Bulgaria

[21] Appl. No.: 916,069

[22] Filed: Jun. 16, 1978

[30] Foreign Application Priority Data

Jun. 16, 1977 [BG] Bulgaria .................................. 36657

[51] Int. Cl.³ .......................................... B65H 17/22
[52] U.S. Cl. ..................................... 226/181; 226/187
[58] Field of Search ............... 226/176, 168, 181, 187, 226/90, 91, 111; 219/130; 242/47.1

[56] References Cited

U.S. PATENT DOCUMENTS

| 3,738,555 | 6/1973 | Karnes et al. | 226/168 |
|---|---|---|---|
| 3,744,694 | 7/1973 | Karnes et al. | 226/168 |
| 4,049,172 | 9/1977 | Samokovliski et al. | 226/90 |
| 4,085,880 | 4/1978 | Samokovliski et al. | 226/90 |

Primary Examiner—Leonard D. Christian

[57] ABSTRACT

A planetary device for feeding electrode wiring in welding operations is provided with a housing through which the wire is fed, the central portion of the housing being shaped as a flange with a hub, and the front side thereof being provided with seats housing pistons bearing radially adjustable wire-feeding rollers. The piston heads are in constant contact with the shorter arms of bow-type double-armed levers hingedly affixed to the flange portion of the hub and located perpendicularly to the axis of the electrode wire fed through the housing. The longer arms of the levers contact the surfaces of a cam supported in the hub of the housing for rotation with respect thereto. A torque spring in the form of an Archimedes spiral, disposed between the flange of the housing and the cam, and having its respective inner and outer ends affixed to such members, constantly urges the cam with respect to the housing in such direction as to urge the rollers inwardly into engagement with the electrode wire. Wire is initially fed into the device with the device at rest and with the canted wire-feeding rollers forced apart against the opposition of the spring. The rollers are now brought into engagement with the wire, and the feeding of the wire by the device is started by driving the housing to rotate the canted rollers around the wire and thus to feed the wire forwardly.

10 Claims, 9 Drawing Figures

PLANETARY WIRE-FEEDING DEVICE

This application is related to Samokovliski et al U.S. Pat. No. 4,085,880.

This invention relates to a planetary device for feeding electrode wire in welding operations, the device resiliently adjusting the wire-feeding rollers thereof to the diameter of the electrode wire being fed.

BACKGROUND OF THE INVENTION

In Deutsche Offenlegungsschrift (DE-OS) No. 26-43-102 there is disclosed a planetary feeding device for electrode wire wherein the adjusting of the wire-feeding rollers is performed by a calibrated spring and the electrode wire fed thereby is subjected to a steady compressing force.

This device consists of a housing on one side of which, running parallel to the passage therethrough for feeding electrode wire, there are seats wherein axially movable pistons are housed. Each piston has a rigidly fixed stub shaft thereon upon which there is mounted by way of a bearing a wire-feeding roller having an outer work surface of hyperbolic shape. The stub shafts upon which the wire-feeding rollers are mounted are disposed perpendicular to the axes of movement of the pistons, and are disposed at an angle of from 20°–45° with respect to each other.

The other side of the housing has an elongated hollow cylindrical part upon which there is mounted an axially movable guiding cone. The movement of the cone is limited by an adjusting nut. The nut is threaded onto the end of the hollow cylindrical part of the housing. Between the guiding cone and the periphery of the housing, on its hollow cylindrical part, there is disposed a calibrated spring. The spring constantly pushes the guiding cone outwardly from the periphery of the housing. Cutouts are machined along the periphery of the housing, double-armed levers having arms of different lengths are hingedly affixed to the housing at the cutouts upon axles. The shorter arm of each lever rests on the head of one of the pistons, while the longer arm cooperates with the outer surface of the guiding cone by means of a roller mounted upon the end of such longer arm.

The double-armed levers are disposed parallel to the electrode wire being fed by the device, and thus the differences in their lengths and in their overall lengths are of considerable importance to the magnitude of the compressive force exerted by the wire-feeding rollers upon the electrode wire. The prior device now being described feeds the electrode wire with a constant forwarding force. It also can be used to work with electrode wires of various diameters.

Such prior device, however, has the very considerable disadvantage that the location of the levers markedly increases its dimensions. The comparatively great lengths of the wire-feeding device, due mainly to the length of the levers, contributes to increased centrifugal forces acting thereupon by reason of its unbalance, thereby shortening the operating life of the bearings of the electric motor which drives it. Another important shortcoming of the above-described prior device is the inability of providing directly an elastic link between the rollers and the resilient element such as the calibrated spring.

The impact of the centrifugal forces when feeding the electrode wire at high speeds is also disadvantageous. In this case, because of the comparatively greater mass of the pistons and rollers plus the mass of the longer arms of the levers, it is difficult to achieve a centrifugal compensation. The centrifugal forces acting at the lower ends of the levers are a resultant of the tangential force produced by the rotation of the device and the radial force resulting from the centrifugal forces developed by the rotating masses. This resultant has not been compensated for in a completely satisfactory manner.

Another known planetary wire-feeding device is shown in Deutsche Offenlegungsschrift (DE-OS) No. 26-43-10. In such latter known device, the disadvantage resulting from the location of the levers parallel to the electrode wire is eliminated, the device employing bow-like levers which are located perpendicularly to the direction of travel of the wire. As in the first-described prior device, the shorter arm of each lever is in contact with pistons which slide the work-feeding rollers, while the longer arms engage the working surfaces of a cam which is rotatable with respect to the housing and is directly driven by the electric motor.

An important disadvantage of such above-described second prior device is the lack of an elastic element to ensure a smooth gradually-increasing force of engagement between the wire-feeding rollers and the wire. Here the compression force is not calibrated; this is not equally desirable in the feeding of wires of different hardnesses, such as hard wires (steel) or soft wires (aluminum). The adjustment of the wire-forwarding force exerted by the feeding rollers is effected by the difference between the masses of the cam and of the housing in their mutual rotation and cannot be changed when working with wires of different degress of hardness.

SUMMARY OF THE INVENTION

The present invention has among its objects the provision of a planetary wire-feeding device of smaller length and less weight than was hitherto possible, such device being provided with an elastic adjustment of the rollers to the diameter of the electrode wire, and at the same time achieving a calibrated adjustment of the pushing or wire-forwarding force according to the diameter of the electrode wire and the material of which it is made.

In accordance with this object, there is provided a planetary wire-feeding device which includes a housing disposed axially in the direction of travel of the electrode wire, the housing being designed in its central part as a flange with a hub, the forward or front part of the housing being provided with seats located parallel to the direction of travel of the electrode wire. Pistons fit into the seats, such pistons carrying radially moving wire-feeding rollers.

The heads of the pistons are in constant contact with the shorter arms of bow-type double-arm levers, the levers being pivotally mounted upon the flange of the housing. The levers are located perpendicular to the electrode wire, the end of the longer arm of each lever being in contact with the cam surface of a cam which is supported by means of a bearing in the hub of the housing. Between the flange and the cam there is disposed a coil torque spring shaped like an Archimedes spiral, the inner end of such spring being secured to the housing and the outer end of the spring being secured to the cam. The housing is rotatably driven.

In order to thread the electrode wire between the feeding rollers, it is necessary for the rollers to be separated. This is achieved by means of turning the cam with relation to the housing, thereby stressing the spring. The positioning of the cam, while the electrode wire is passing between the rollers, is effected by pins which are pivotally mounted upon the flange of the housing. These pins engage teeth at the lowest part of the cam surfaces of the cam when the housing is at rest.

In an alternative construction, such temporary fixing of the cam with respect to the housing is accomplished by means of a fixing pin which is mounted together with a pushing spring in a seat on the rear cover of the device. One end of the fixing pin stays in a seat in the flange of the housing, while its other end is disposed outside the rear cover of the device.

In the device herein described and illustrated, the cam and the rear cover of the device are rigidly fixed and ensured against axial displacement.

To secure various degrees of pre-set force of the torque spring, which is necessary when feeding electrode wires made of different materials, several spring seat openings to receive the outer end of the spiral spring are provided in the cam, such openings being so located that the spiral spring may selectively be placed under different initial stresses. The same result can be achieved by replacing the torque spring itself by other springs having different desired compression characteristics.

In order to eliminate the harmful impact of centrifugal forces, weights are hung on the ends of the longer arms of the levers to balance the masses of the pistons.

The advantages of the device of the invention include the substantial reduction in length of the device, which in turn reduces the load imposed upon the driving motor. The weight of the device is reduced, and conditions are created for a more precise balancing of harmful centrifugal forces. The life of the wire-feeding rollers is prolonged by reasons of the soft, elastic link between them and the tightening element, that is, the cam and the levers.

DESCRIPTION OF THE DRAWINGS

The invention will be more readily understood by reference to the accompanying drawings which illustrate preferred embodiments of the device. In such drawings.

DESCRIPTION OF THE PREFERRED EMBODIMENTS

Figure 1:
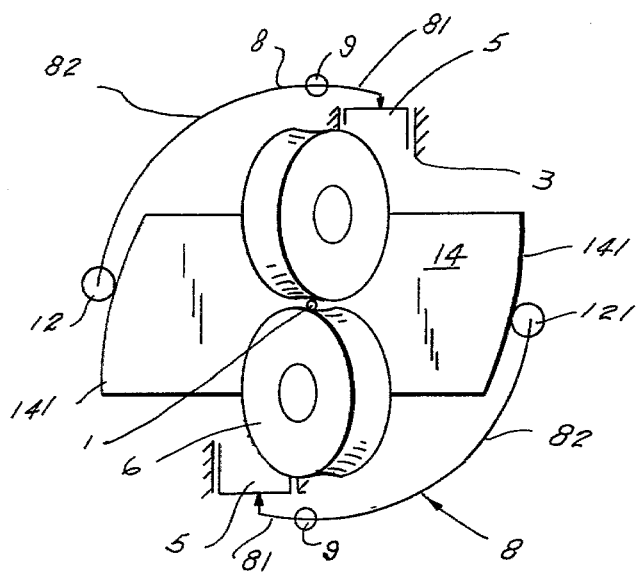
FIG. 1 is a schematic view of the device as the working elements thereof would appear as viewed in the direction from left to right in FIG. 3 through the front cover of the device.
Figure 2:
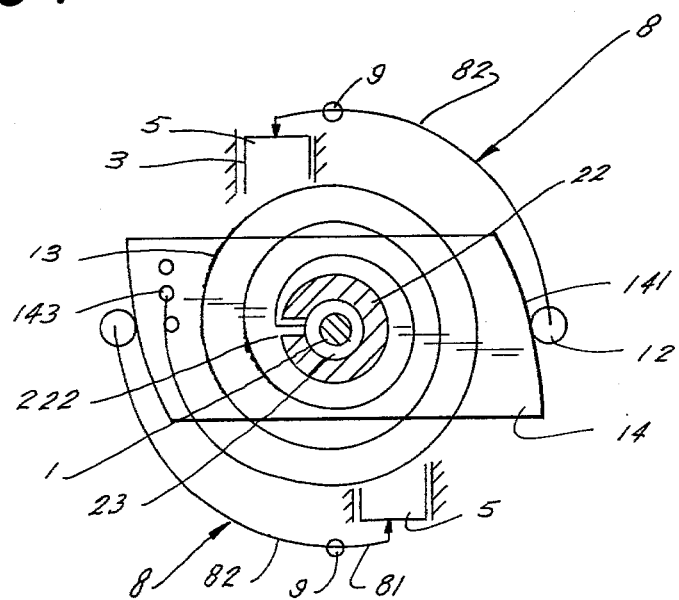
FIG. 2 is a similar view of the working elements of the device as they would appear if viewed in the direction from right to left in FIG.3.
Figure 3:
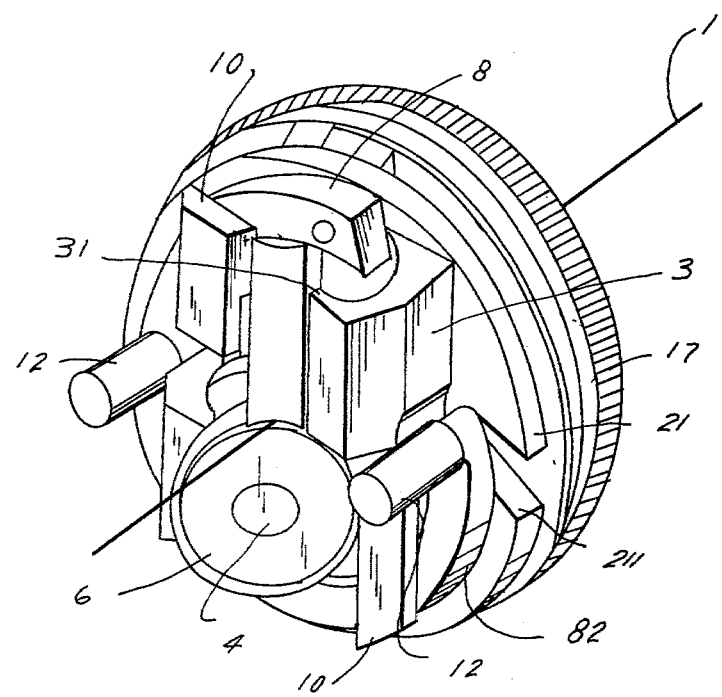
FIG. 3 is an axonometric view of the device, the front end of the device being positioned at the left and the rear end of the device being positioned at the right, the front cover of the device having been removed.
Figure 5:
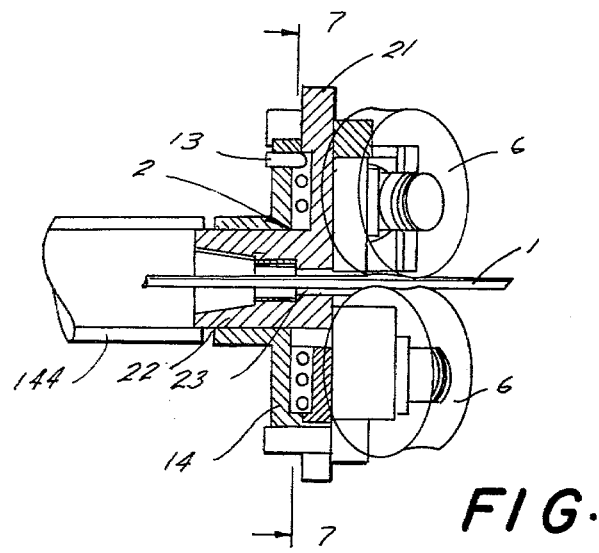
FIG. 5 is a view in vertical axial cross-section through the device without its front and rear covers.
Figure 4:
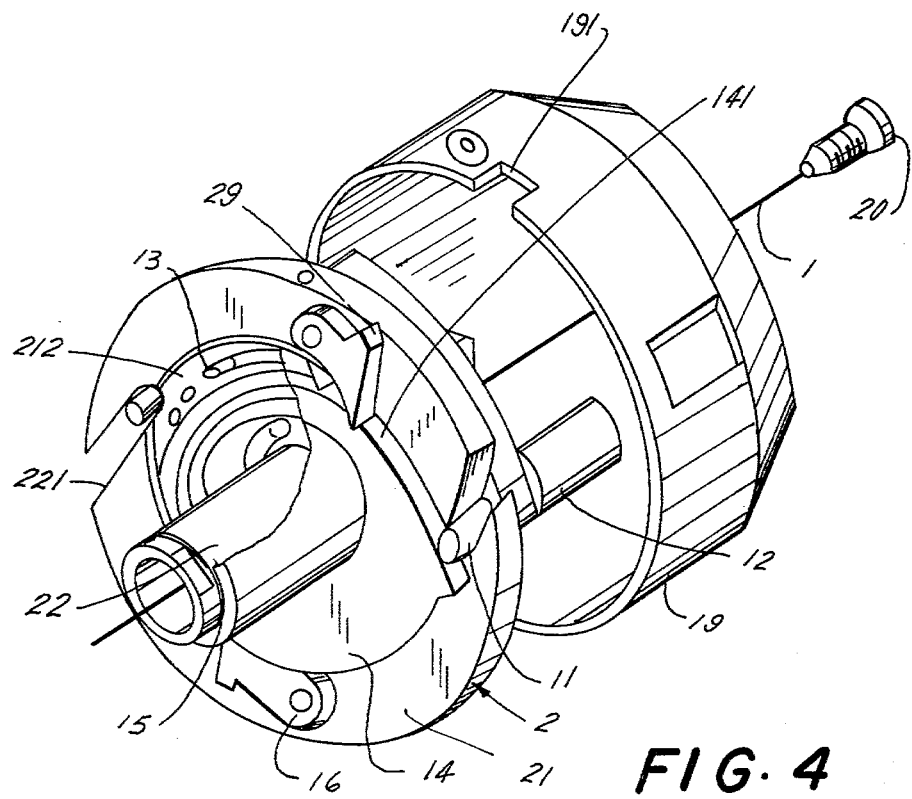
FIG. 4 is an axonometric, partially-exploded view of the device, the rear end of the device being positioned at the left and the front end of the device being positioned at the right, the rear cover of the device having been removed.
Figure 6:
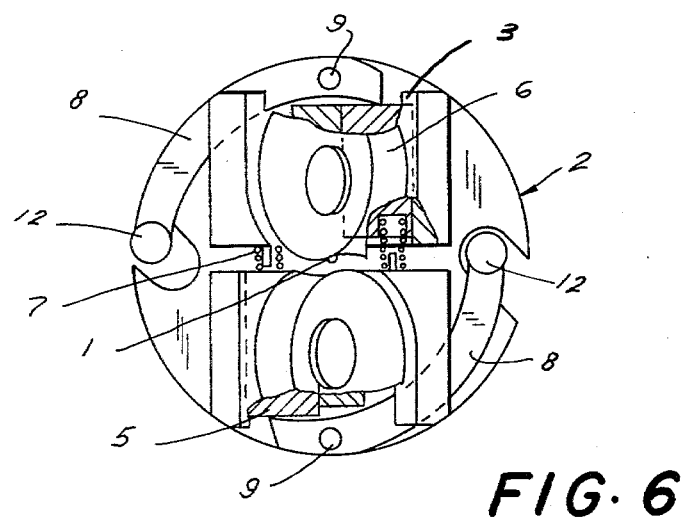
FIG. 6 is a view in end elevation of the device as shown in FIG. 5, the view being taken in the direction from right to left in FIG. 5.
Figure 7:
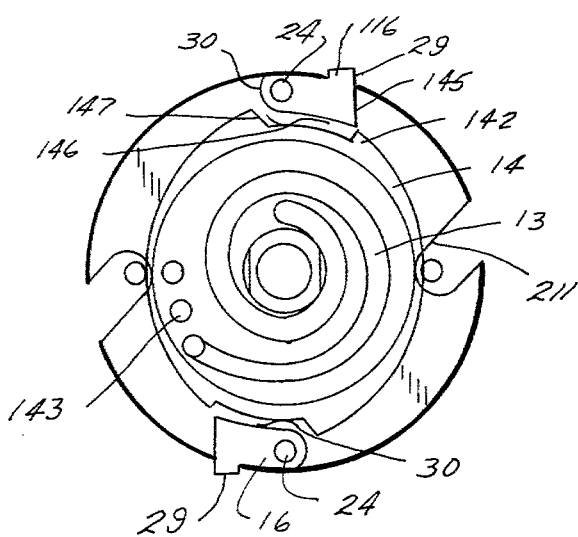
FIG. 7 is a view in vertical transverse section through the device, the section being taken along the line 7—7 in FIG. 5.

Turning first to FIGS. 3, 4, and 5, it will be seen that the illustrated device is composed of a housing 2, such housing having a central part shaped as a flange 21 and a rearwardly extending central hub 22. At the front end of the housing 2 (at the left in FIG. 3 and at the right in FIG. 5) there are two parallel seats 3 for pistons 5. The seats 3 are disposed symmetrically on both sides of the central passage 23 through which the electrode wire 1 passes as it is fed by the device. At the exit end of the passage 23 the seats 3 have grooves 31 (FIG. 3) through which axles 4, on which wire-feeding rollers 6 are mounted by bearings, freely pass. Each of the axles 4 is fastened to the respective piston 5, opposing axles 4 being positioned at an angle with respect to each other. Pistons 5, whose cross-section is a cylinder slanted along the length of its side to which the axle 4 is fixed, have in their inner sides blind holes 51 housing small coil compression springs 7 which thrust the pistons 5, and the wire-feeding rollers 6 which they carry, away from each other.

The wire-feeding rollers 6 are thrust toward each other, and thus pressed against the electrode wire 1 being fed, by two bow-type double-arm levers 8 having arms of unequal length, the shorter arms 81 of each lever 8 being in constant contact with the heads or outer ends of the pistons 5. The levers 8 are mounted on axles 9 affixed to the front portion of the flange 21 of the housing 2, guiding elements 10 coacting with the levers permitting movement of the levers in only one plane around the axles 9. At the end portion of each longer arm 82 of levers 8 there is a hole housing a pin 11 which passes through both sides of the lever 8. The end of the pin 11 disposed adjacent the rollers 6 carries a weight 12 designed to counterbalance centrifugal forces, the other end of the pin 11 passing through cutout 211 of the flange 21 and emerging at the other side of the flange. On the other side of flange 21, concentric with hub 22 of the housing 2, there is a seat 212 housing a torque spring 13 in the shape of an Archimedes spiral. The inner end of spring 13 is fixed to housing 2 at an opening 222 therein, while the outer end of the spring is fixed at 143 to cam 14, the cam 14 acting as a closure for the seat 212.

The cam 14 is mounted by means of a bearing on the hub 22 of the housing 2, thus allowing the cam to rotate relative to the hub 22. At the same time, the cam is rigidly fixed to rear cover 17, which forms the rear part of the device at the end thereof to which the electric motor (not shown) for driving the device is located. A retaining ring 15 at the end of the hub 22 prevents the cam 14 and the cover 17 from relative axial displacement.

The planetary device also has a front cover 19, enclosing the housing 2 and fastened to the periphery of flange 21 of the housing 2 by means of screws as shown. The front cover 19 and the rear cover 17 can rotate relative to each other. A nozzle 20 for receiving the electrode wire to be fed (FIG. 4) is affixed to the center of the front cover 19; the nozzle 20 is interchangeable with others so as to provide for the guiding of electrode wires having different diameters.

The cam 14 has two diametrically disposed symmetrical peripheral cam surfaces 141, which are constantly in contact with the pins 11, which act as cam followers, passing through the cutouts 211. On the lower portion of each cam surface of cam 14 there is a tooth 142 which is selectively engaged by a tooth 145 on a pawl 16 pivotally mounted on the flange 21 by a pivot pin 24. Each pawl 16 has a projection 29 which is selectively seated in an aperture 191 in the front cover 19. A leaf spring 30, adapted to disengage the pawl 16 from the tooth 142 on the surface 141 of each portion of the cam 14, is rigidly affixed to the pawl 16 on the side thereof confronting the cam 14.

The threading of the electrode wire into the planetary wire-feeding device, as well as the adjusting of the cam 14 with respect to the flange 21 by the pawl 16, is effected in the following manner:

The rear cover 17, together with the cam 14, are turned relative to the front cover 19 and the housing 2, and at the same time the pawls 16 are pressed inward by means of the projections 29, until the pawls 16 engage the respective teeth 142. In this position, the torque spring 13 is subjected to additional torque, while the cam following portions of the pins 11 on levers 8 fall in the lowest portion of the cam surfaces of cam 14 under the action of the small springs 7, which in their turn push the pistons 5 radially outwardly and elevate the lever arms 81 of the bow-type levers 8. Along with the pistons 5 the wire-feeding rollers 6 are separated one from the other, thus allowing the electrode wire to be threaded between the rollers.

Following this, the two covers 17 and 19 are subjected to an additional forced turning in the original direction relative to each other until the pawls 16 are elevated by the engagement of a convex portion 146 of the leaf springs 30 with respective ramps 146 on the cam 14 and release the cam 14 from its fixed position. The released cam 14, along with the rear cover 17, turns in the reverse direction under the influence of the spiral torque spring 13, while the cam following portions of pins 11 are elevated toward the highest portion of the cam surfaces of the cam 14. As a result, the longer arms 82 of the bow-type levers 8 are pushed to the periphery of the flange 21, and by rotating around their axles 9 press the pistons 5 by their shorter arms 81 inwardly toward each other until the wire-feeding rollers 6 feedingly cooperate with electrode wire 1. In this position the spring 13 remains under enough stress to exercise through the levers 8 and the wire-feeding roller 6 the necessary effort to push the electrode wire forward when the housing 2 is rotatably driven by a motor (not shown) through a tubular driving member 144 (FIG. 5) connected to hub 22.

Figure 8:
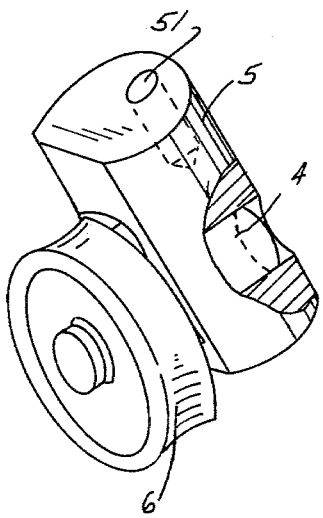
FIG. 8 is an axonometric view of a piston and roller employed in the device of FIGS. 1-7, inclusive.
Figure 9:
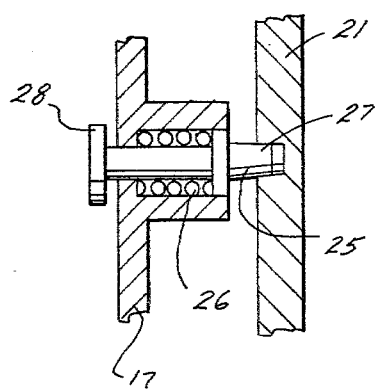
FIG. 9 is a fragmentary view in cross-section through a second embodiment of the mechanism employed to maintain the wire-feeding rollers in spread-apart condition when the electrode wire is initially threaded through the device.

FIG. 8 shows a second embodiment of the arrangement for the fixing of the cam 14 to the flange 21 of the housing 2 during the threading up operation of the device. In such embodiment, such fixing is effected by a fixing pin 25, mounted together with a pushing spring 26 in a seat on the rear cover 17. One end of the fixing pin 25 enters a seat 27 in the flange 21, while its other end projects outwardly of the cover 17 and terminates in an enlarged head 28. In order to thread the electrode wire in a device provided with such latter fixing means, it is also necessary to turn the two covers 17 and 19 relative to each other until the end of the fixing pin 25 finds the seat 27 in the flange 21. In this position, the spring 13 is stressed and the rollers 6 of the electrode wire-feeding device separate from each other. In order to release the spring 13 from the fixed position, the pin 25 is pulled, and the cam 14 resumes its original position, while the rollers 6 press against the electrode wire 1.

As the planetary wire-feeding device of the invention can operate with various diameters of wire and with wires made of different materials, which naturally require different pushing forces, it is necessary only to change the compression spring 13 or to vary its preset force. The latter can be done relatively easily, by changing the position at which the outer end of the spring 13 is fastened to the cam 14. As above-explained, the cam 14 is provided with several holes 143 disposed at different positions circumferentially thereof, thereby corresponding to a greater, or a smaller, preset force exerted by the spring 13.

Although the invention has been illustrated and described with reference to a plurality of preferred embodiments thereof, it is to be expressly understood that it is in no way limited by the disclosure of such a plurality of embodiments, but is capable of numerous modifications within the scope of the appended claims.

What is claimed is:

1. A planetary device adapted for feeding electrode wire in welding, said device comprising a housing rotatable about an axis, the central portion of the housing being shaped as a flange with a hub, seats on one side of the flange, said seats housing pistons bearing radially moving canted rollers which feed the wire along the axis of the housing as the housing rotates, bow-type double-arm levers hingedly affixed to the flange portion of the hub and symmetrically disposed in a plane perpendicular to the axis of rotation of the housing, said levers each having a long and a short arm, a cam rotatably mounted on the hub of the housing, said cam having two symmetrically disposed cam surfaces engaging the outer ends of the respective longer arms of the levers, a spiral torque spring located between the flange and the cam, the opposite ends of the spring being affixed respectively to the housing and to the cam, said spring acting to maintain the outer end of the shorter arms of the levers in constant engagement with the heads of the pistons, whereby to maintain the canted rollers in effective, wire-feeding contact with the electrode wire.

2. The device according to claim 1, wherein the seats, the pistons, and the canted rollers are disposed on the front, wire-entering side of the flange.

3. A device according to claim 1, wherein the cam is located rearwardly of the rear side of the flange, and comprising cam-following pins on the outer ends of the longer arms of the levers, said pins extending through arcuate cutouts in the flange of the housing, the axes of the pins extending parallel to the axis of rotation of the housing.

4. A device according to claim 1, comprising weights affixed to the outer ends of the longer arms of the levers, said weights balancing the centrifugal forces generated during the rotation of the flange, the hub, the seats, the pistons, and the canted feeding rollers.

5. A device according to claim 1, comprising a rear cover for the housing, said cover being fixedly connected to the cam, and means for preventing axial displacement of the rear cover and the cam with respect to the flange.

6. A device according to claim 5, comprising a front cover covering the front portion of the housing, means affixing the front cover to the periphery of the flange of the housing, and wherein the front cover and the rear cover are rotatable with respect to each other.

7. A device according to claim 6, comprising a plurality of selectively employed means for affixing the outer end of the torque spring to the cam, said spring end affixing means being spaced angularly about the axis of the cam, the outer end of the torque spring being connected to the cam by a selected one of said spring end affixing means thereby to permit adjustment of the preset stress by which the canted wire-feeding rollers are urged against the wire by the torque spring acting through the cam, the levers, and the pistons.

8. A device according to claim 1, comprising means for prestressing the torque spring and for separating the canted wire-feeding rollers when the housing is at rest so that the wire may be fed freely into the device and between the rollers, and means for thereafter releasing the pistons and rollers so that the rollers may engage the wire prior to setting the housing of the device into rotation.

9. A device according to claim 8, wherein the means for prestressing the spring, for separating the rollers, and for thereafter releasing the rollers, comprises a tooth in the lowest portion of the cam surfaces of the cam, pawls pivotally mounted upon the flange, each pawl having a detent adapted to cooperate with a respective tooth on the cam, each pawl having a projection seated in an aperture in the front cover, each pawl carrying a bent leaf spring fixedly connected thereto, said leaf spring cooperating with a respective ramp on the cam in such manner that turning of the cam to advance the ramp toward the pawl disengages the teeth on the pawls from their respective detents on the cam.

10. A device according to claim 8, comprising a fixing pin having a pushing spring, the pin and pushing spring being mounted in a seat in the rear cover, the fixing pin cooperating with a recess in the cam so that the cam is affixed to the flange of the housing when the free end of the fixing pin is positioned in the recess in the cam.

* * * * *